US008132645B2

(12) United States Patent
Weber

(10) Patent No.: US 8,132,645 B2
(45) Date of Patent: Mar. 13, 2012

(54) ATTENUATION DEVICE PARTICULARLY PULSATION ATTENUATOR

(75) Inventor: Norbert Weber, Sulzbach/Saar (DE)

(73) Assignee: Hydac Technology GmbH, Sulzbach/Saar (DE)

( * ) Notice: Subject to any disclaimer, the term of this patent is extended or adjusted under 35 U.S.C. 154(b) by 0 days.

(21) Appl. No.: 12/452,938

(22) PCT Filed: Aug. 13, 2008

(86) PCT No.: PCT/EP2008/006647
§ 371 (c)(1),
(2), (4) Date: Jan. 29, 2010

(87) PCT Pub. No.: WO2009/039916
PCT Pub. Date: Apr. 2, 2009

(65) Prior Publication Data
US 2010/0133038 A1 Jun. 3, 2010

(30) Foreign Application Priority Data
Sep. 21, 2007 (DE) .......................... 10 2007 045 266

(51) Int. Cl.
| F16K 47/02 | (2006.01) |
| F16L 55/02 | (2006.01) |
| F16L 55/033 | (2006.01) |
| F16L 55/04 | (2006.01) |
| F01N 1/10 | (2006.01) |
| F01N 1/24 | (2006.01) |
| F16L 55/00 | (2006.01) |
| F01N 1/00 | (2006.01) |

(52) U.S. Cl. .......................... 181/233; 181/252; 181/256
(58) Field of Classification Search ................... 181/233, 181/252, 256, 230, 207
See application file for complete search history.

(56) References Cited

U.S. PATENT DOCUMENTS

| 2,261,948 | A | * | 11/1941 | Beach | 181/233 |
| 2,756,172 | A | * | 7/1956 | Kidd | 138/147 |
| 2,949,975 | A | * | 8/1960 | Plummer | 181/230 |
| 3,134,611 | A | * | 5/1964 | Iversen | 285/54 |
| 3,142,354 | A | * | 7/1964 | Kammerer et al. | 181/252 |
| 3,160,549 | A | * | 12/1964 | Caldwell et al. | 428/317.3 |
| 3,233,699 | A | * | 2/1966 | Plummer | 181/243 |
| 3,263,771 | A | * | 8/1966 | Seifert | 181/252 |
| 3,495,950 | A | * | 2/1970 | Frost et al. | 422/171 |
| 3,589,971 | A | * | 6/1971 | Reed | 137/377 |
| 4,190,131 | A | * | 2/1980 | Robinson | 181/296 |
| 4,421,202 | A | * | 12/1983 | Hoy | 181/252 |
| 4,442,585 | A | * | 4/1984 | McGehee et al. | 29/432 |
| 4,444,403 | A | * | 4/1984 | Morris | 277/336 |
| 4,615,411 | A | * | 10/1986 | Breitscheidel et al. | 181/224 |
| 4,778,028 | A | * | 10/1988 | Staley | 181/208 |

(Continued)

FOREIGN PATENT DOCUMENTS
DE 977 514 C 11/1966
(Continued)

*Primary Examiner* — Edgardo San Martin
(74) *Attorney, Agent, or Firm* — Roylance, Abrams, Berdo & Goodman, L.L.P.

(57) ABSTRACT

An attenuation device, particularly a pulsation attenuator, has a casing (1) defining a fluid chamber (11) through which a fluid may flow along a flow axis (7), and has an attenuation element made of a resilient material located within the casing (1). The attenuation element has at least two annular bodies (15, 17) that are disposed in an at least partially overlapping manner, surrounding the flow axis (7) at least partially.

20 Claims, 1 Drawing Sheet

U.S. PATENT DOCUMENTS

| | | | |
|---|---|---|---|
| 5,101,930 A * | 4/1992 | Fargo et al. | 181/233 |
| H1317 H | 6/1994 | Ng | |
| 5,475,976 A * | 12/1995 | Phillips | 60/327 |
| 5,622,662 A * | 4/1997 | Veiga et al. | 264/45.3 |
| 5,767,459 A * | 6/1998 | Sell | 181/258 |
| 5,892,186 A * | 4/1999 | Flugger | 181/252 |
| 6,857,502 B2 * | 2/2005 | Naito | 181/252 |
| 6,932,190 B2 * | 8/2005 | Sishtla | 181/290 |
| 6,983,820 B2 * | 1/2006 | Boast et al. | 181/249 |
| 7,131,287 B2 * | 11/2006 | Uselton | 62/296 |
| 7,325,474 B2 * | 2/2008 | Yoshimura et al. | 89/14.4 |
| 7,424,931 B2 * | 9/2008 | Smith | 181/256 |
| 2005/0022548 A1 | 2/2005 | Sishtla | |

FOREIGN PATENT DOCUMENTS

| | | |
|---|---|---|
| DE | 3230931 A1 * | 7/1983 |
| DE | 38 08 387 A1 | 9/1989 |
| DE | 43 38 912 C1 | 4/1995 |
| DE | 10 2006 016 938 B3 | 12/2007 |
| EP | 412315 A2 * | 2/1991 |
| FR | 2681905 A1 * | 4/1993 |
| JP | 54105627 A * | 8/1979 |
| JP | 05187219 A * | 7/1993 |

* cited by examiner

ATTENUATION DEVICE PARTICULARLY PULSATION ATTENUATOR

FIELD OF THE INVENTION

The invention relates to an attenuation device, particularly a pulsation attenuator, with a casing defining a fluid chamber through which a fluid can flow along a flow axis. An attenuation element of resilient material is located in the casing.

BACKGROUND OF THE INVENTION

Attenuation devices for smoothing of pressure surges in fluid systems and for reducing the resulting vibrations and noise can be divided mainly into two known groups of attenuation devices. One group includes hydropneumatic attenuators as hydraulic accumulators containing an additional gas volume. The other group includes fluid sound attenuators, so-called silencers, in which without an additional gas volume an attenuation effect takes place by reflection or absorption. Reference is made to the technical book "The Hydraulic Trainer, Volume 3," published by Mannesmann Rexroth, pages 106 and 107, for the corresponding prior art.

With hydropneumatic attenuators good properties can be achieved in a frequency band extending from very low frequencies to about 400 Hz. These attenuators would then be suitable for use in fluid systems in which pressure pulsations occur in this frequency band due to operation of hydraulic pumps, their engagement and disengagement processes, and valve operating processes. Since these attenuators with additional gas volumes are both bulky and heavy, these attenuation devices cannot be used in many applications where there is very limited installation space and a lightweight construction is necessary, as is the case, for example, in hydraulic systems in motor vehicles. Other disadvantages of attenuation devices with gas filling are that their attenuation action varies depending on the temperature and that the attenuation action overall is degraded by gas losses due to permeation.

Conversely, so-called silencers are a far more compact and have a lightweight construction. However, their use is limited by the attenuation action being sufficient only at higher frequencies of more than about 200 Hz. This limitation prevents use in automotive engineering where in hydraulic systems assigned to the steering, braking and stability control systems or in active suspension systems, operating processes can take place in a very wide frequency band extending from very low frequencies to high frequencies of 500 Hz or more.

To solve these problems, DE 43 38 912 C1 discloses a pressure surge attenuator for reducing hydraulic shocks in fluid lines. In this known solution, the pressure fluctuations coupled to the compressive gas volume acting as a resilient attenuation element in hydropneumatically operating attenuators are coupled to a resilient material. This arrangement yields a frequency behavior similar to the hydropneumatic attenuators, at a conversely reduced size and reduced weight. However, an adequate attenuation action cannot be achieved by this known solution.

SUMMARY OF THE INVENTION

An object of the invention is to provide an attenuation device with a compact and lightweight construction, as necessary for use in automotive engineering, characterized by especially good attenuation action.

According to the invention, this object is basically achieved by an attenuation device where, instead of a uniform body located in the fluid chamber as used in the prior art as the attenuation element, an attenuation element is composed of a combination of annular bodies. This combination of resilient bodies allows spring paths and spring characteristics ensuring optimum attenuation action when matched to a given frequency band.

In the configuration of the attenuation element, there can be annular bodies with the same axial length and/or annular bodies with the same radial thickness relative to the flow axis, depending on the construction circumstances or the desired behavior of the characteristics.

Here, the arrangement can be made such that the annular bodies are arranged adjoining one another on top of one another.

If, in this connection, pairs of annular bodies of different materials, for example of different density and thus resilience of varied intensity, are used, preferably the inner annular body of each pair of annular bodies which is nearer the flow axis can be formed from a material of greater resilience than is the case for the annular body located above it. With the corresponding material combinations the desired behavior of the characteristics, for example a progressive behavior, can be implemented.

In preferred embodiments, the annular bodies have an uninterrupted, closed annular shape, and the annular bodies can have an annular shape concentric to the flow axis.

To achieve optimum attenuation action, several pairs of annular bodies can surround one another in succession in the axial direction of the flow axis. In turn with respect to density and resilience of the material, there can be pairs of rings of different properties.

In especially advantageous embodiments the casing forms an enclosure for the respective outer annular body of the attenuation element.

The casing can have a wall separating the attenuation element fluid-tight from the fluid chamber. The casing then has a double-walled configuration with an inner wall bordering the fluid chamber and an outer wall located above the annular body being the outer one at the time.

If the respectively inner annular body of the attenuation element adjoins the inner wall of the casing bordering the fluid chamber, for the annular bodies a chambered arrangement is between the wall bordering the fluid chamber and the outer wall of the casing adjoining the outer annular body.

In the exemplary embodiments in which the casing separates the fluid chamber fluid-tight from the attenuation element, the material of the annular bodies can be an open-pore or cellular material.

The material can be, for example, a PU foam or a synthetic rubber, particularly ethylene-propylene-diene rubber (EPDM), preferably foamed EPDM.

Suitable material of the casing can be oil-resistant and fuel-resistance elastomers, for example, a fluorinated rubber material, particularly based on vinylidene fluoride-hexafluoropropylene copolymerizates.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
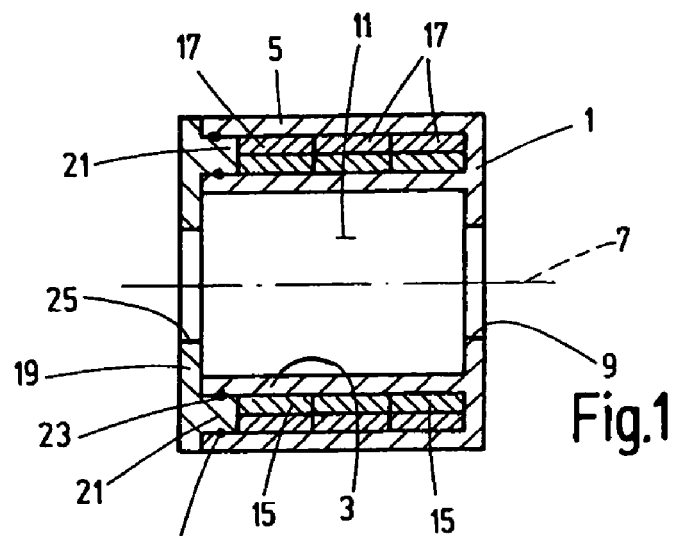
FIG. 1 is a side elevational view in section schematically illustrating an attenuation device according to a first exemplary embodiment of the invention.

In the two exemplary embodiments shown in the drawings, the attenuation device has a casing 1 of oil-resistant and fuel-resistant elastomer material, for example of synthetic rubber. These examples are fluorinated rubber material based on vinylidene fluoride-hexafluoropropylene copolymerizates. This material is commercially available under the trade name Viton®. Instead of elastomers, other types of materials can be used, for example a metallic material which could form the casing.

Figure 2:
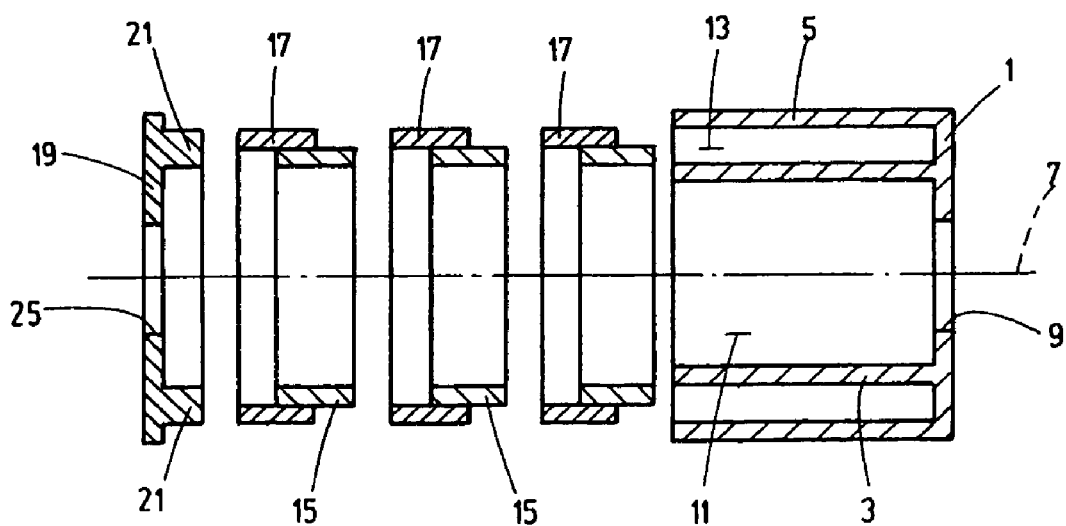
FIG. 2 is an exploded side elevational view in section of the attenuation device of FIG. 1.

As is most clearly illustrated in FIG. 2, the casing 1 is made as a double-walled hollow cylinder, with a circularly cylindrical inner wall 3 and a circularly cylindrical outer wall 5 concentric to an axis 7. The axis 7 constitutes the flow axis for the flow of a fluid stream to be attenuated and flowing into the inner fluid chamber 11 via an opening 9 provided in the end wall of the casing 1.

Between the inner wall 3 and the outer wall 5, a chamber 13 in the form of an annulus holds the actual attenuation material chambered in the illustrated examples. As FIG. 2 shows most clearly, the attenuation material is a combination of foam inserts. This combination is formed from three pairs of annular bodies located on top of one another, specifically one inner annular body 15 and one outer annular body 17 at a time.

In the two illustrated exemplary embodiments the annular bodies 15, 17 are closed, round rings located on top of one another in alignment and adjoining one another. The inner annular body 15 and outer annular body 17 of each pair have the same radial thickness and the same axial length.

Alternatively, the annular bodies could be of different radial thicknesses and/or different axial lengths. Instead of closed, uninterrupted annular bodies, they could be annular bodies composed of individual annular segments.

While the pairs of annular bodies are arranged axially abutting one another as is shown in FIG. 1, there could be gaps between successive pairs of annular bodies.

In the example of FIGS. 1 and 2, the casing 1 is closed on the end opposite the opening 9 by a cover 19 formed from the same material as the remaining part of the casing 1. The cover 19 has an annular edge 21 projecting axially to the inside and engaging appropriately as a sealing part of the chamber 13 between the inner wall 3 and outer wall 5, and is fixed at bonding sites 23 (see FIG. 1). The cement can be a two-component adhesive. The cover 19 has an opening 25 which corresponds to the opening 9 for fluid flow.

Figure 3:
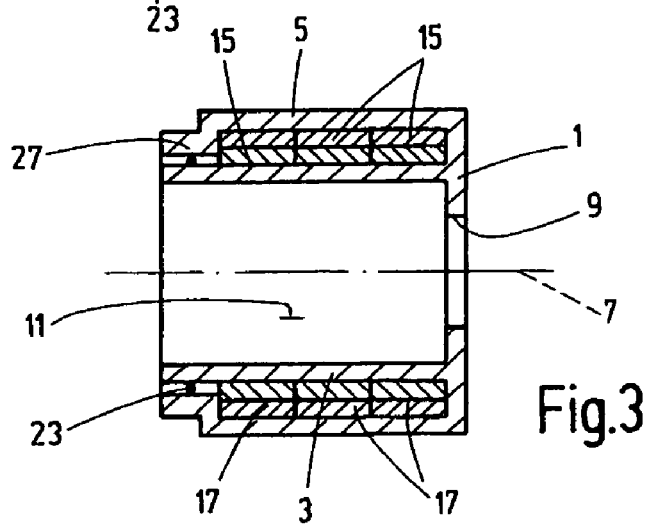
FIG. 3 is a schematic, side elevational view in section of an attenuation device according to a second exemplary embodiment of the invention.

The exemplary embodiment shown in FIG. 3 differs only in that the casing 1 does not have a cover on the end of the fluid chamber 11 opposite the opening 9. Instead, the outer wall 5 of the casing 1 as a termination of the chamber which holds the annular bodies 15 and 17 has an end-side wall part 27 drawn radially to the inside and cemented to the inner wall 3 via the bonding site 23. As in the first embodiment, by the bonding site 23, fluid-tight sealing of the chamber 13 containing the pairs of annular bodies is formed.

This fluid-tight separation yields free selection possibilities with respect to use of attenuation materials. Thus both closed-pore materials and also open-pore or cellular materials can be used. Advantageously PU foams or synthetic rubbers such as ethylene-propylene-diene rubber (EPDM), preferably foamed EPDM, can be provided. As already noted, instead of the illustrated uniform pairs of annular bodies, there can annular bodies in a different number and in a different unaligned arrangement on top of one another. In particular, the resilience which is determined, for example, by the material density for the inner annular bodies 15 and the outer annular bodies 17 is chosen to be different in order to achieve the desired attenuation characteristics matched to the prevailing frequency band. Preferably the inner annular bodies 15 nearer the fluid chamber 11 have greater resilience than the outer annular bodies 17 supporting them on the outside. The pairs of annular bodies following one another in the axial direction can also have different resilience. Furthermore, the casing 1 could be structured such that especially at an elevated pressure level, the outer wall 5 as the support of the outer annular bodies 17 has a rigid structure (for example metallic structure), while the inner wall 3 is formed from a resilient elastomer to effectively couple the pressure surges to the attenuation material.

The casing of the body 17 can also be applied by special enamels (coatings) in an immersion, painting or spraying process. These enamels are based, for example, on HNBR or Viton®. A layer of more or less any thickness can be applied by repeated immersion or spraying until a fluid-tight and resistant layer has been applied.

While various embodiments have been chosen to illustrate the invention, it will be understood by those skilled in the art that various changes and modifications can be made therein without departing from the scope of the invention as defined in the appended claims.

What is claimed is:

1. An attenuation device, comprising:
a casing having a fluid chamber through which a fluid can flow along a flow axis and having an annular inner wall and an annular outer wall radially spaced relative to said flow axis to define an annular chamber therebetween separated from said fluid chamber by said inner wall; and
at least first and second pairs of resilient inner and outer annular bodies in axial succession along said flow axis in said chamber, each said inner annular body being surrounded by the respective outer annular body in a radial direction relative to said flow axis.

2. An attenuation device according to claim 1 wherein each of said annular bodies has an equal axial length.

3. An attenuation device according to claim 1 wherein each of said annular bodies has an equal radial thickness.

4. An attenuation device according to claim 1 wherein the respective annular bodies adjoin one another.

5. An attenuation device according to claim 1 wherein said inner annular body of each of said pairs is formed of a material having greater resilience than a material of the outer annular body of that pair.

6. An attenuation device according to claim 1 wherein each of said annular bodies has an uninterrupted, closed annular shape.

7. An attenuation device according to claim 1 wherein each of said annular bodies is concentric to said flow axis.

8. An attenuation device according to claim 1 wherein said annular bodies comprise open-pore material.

9. An attenuation device according to claim 1 wherein said annular bodies comprise cellular material.

10. An attenuation device according to claim 1 wherein said annular bodies comprise closed-pore material.

11. An attenuation device according to claim 1 wherein said annular bodies comprise plastic material.

12. An attenuation device according to claim 11 wherein said plastic material is PU foam.

13. An attenuation device according to claim 11 wherein said plastic material is synthetic rubber.

14. An attenuation device according to claim 13 wherein said synthetic rubber is ethylene-propylene-diene rubber.

15. An attenuation device according to claim 13 wherein the synthetic rubber is foamed ethylene-propylene-diene rubber.

16. An attenuation device according to claim 1 wherein said casing comprises a fluorinated rubber material.

17. An attenuation device according to claim 16 wherein said fluorinated rubber material is based on vinylidene fluoridehexafluoropropylene copolymerizates.

18. An attenuation device according to claim 1 wherein said casing comprises an end wall joining said inner and outer walls and closing said chamber at an axial end thereof.

19. An attenuation device according to claim 18 wherein said casing comprises an annular cover sealing said annular chamber closed at an opposed axial end thereof.

20. An attenuation device according to claim 18 wherein said casing comprises an integral, radial extending wall part sealing said annular chamber closed at an opposite axial end thereof.

* * * * *